United States Patent [19]

Schirmer

[11] Patent Number: 4,605,460
[45] Date of Patent: Aug. 12, 1986

[54] METHOD OF LAMINATING HIGH BARRIER SHRINK FILM

[75] Inventor: Henry G. Schirmer, Spartanburg, S.C.

[73] Assignee: W. R. Grace & Co., Cryovac Div., Duncan, S.C.

[21] Appl. No.: 752,201

[22] Filed: Jul. 3, 1985

Related U.S. Application Data

[62] Division of Ser. No. 538,738, Oct. 3, 1983, Pat. No. 4,542,075.

[51] Int. Cl.$^4$ .................. B32B 27/30; B32B 27/00
[52] U.S. Cl. .................. 156/229; 156/244.24
[58] Field of Search .............. 156/229, 244.13, 244.24; 428/913, 36, 518, 516; 264/176 R

[56] References Cited

U.S. PATENT DOCUMENTS

| | | | |
|---|---|---|---|
| 3,741,253 | 6/1973 | Brax et al. | 428/215 |
| 4,424,243 | 1/1984 | Nishimoto et al. | 428/913 |
| 4,448,792 | 5/1984 | Schirmer | 428/913 |

FOREIGN PATENT DOCUMENTS 1591423  6/1981  United Kingdom .
1591424  6/1981  United Kingdom .

Primary Examiner—Michael Ball
Attorney, Agent, or Firm—John J. Toney; William D. Lee, Jr.; Mark B. Quatt

[57] ABSTRACT

There is provided a heat shrinkable, high barrier laminate film which includes a hot blown, melt oriented high oxygen barrier film, of relatively high crystallinity and correspondingly relatively low ultimate elongation, laminated to a stretch oriented base film having a shrink tension substantially greater than that of said barrier film, the extent of orientation of said base film being sufficient such that its ultimate elongation is reduced so as to be commensurate with that of said barrier film. In one preferred mode, the barrier film is a layflat tubular film having its interior layflat surfaces laminated together. Representatively, the high barrier layer of the barrier film is vinylidene chloride copolymer having at least about 85% by weight vinylidene chloride content, preferably at least about 90%. Associated methods for making the laminate films are also provided.

7 Claims, 4 Drawing Figures

METHOD OF LAMINATING HIGH BARRIER SHRINK FILM

This is a division application of U.S. application Ser. No. 538,738, filed Oct. 3, 1983, now U.S. Pat. No. 4,542,075.

BACKGROUND OF THE INVENTION

This invention relates generally to a laminate film suitable for packaging, especially food packaging, and relates more particularly to a heat shrinkable laminate film having especially high oxygen barrier properties.

In the packaging of food in thermoplastic film, it is frequently desirable that the film provide an oxygen barrier, i.e. have a low permeability to oxygen. For example, film made of a copolymer of 65 to 95% by weight of vinylidene chloride and 5 to 35% of a vinyl comonomer such as vinyl chloride, acrylonitrile or methyl acrylate, generally referred to as saran, is known to give a good oxygen barrier. The term "high barrier vinylidene chloride copolymer" as used herein is intended to refer to a saran having at least about 85% by weight of vinylidene chloride. The oxygen barrier property of vinylidene chloride copolymers tends to increase with increasing content of vinylidene chloride.

Additionally, it is frequently desired in the packaging of food that the packaging film be heat shrinkable so that the film may be shrunk snugly about a contained product thereby presenting an attractive package appearance. In the manufacture of heat shrinkable film, it is commercially advantageous to produce packaging film in tubular form, e.g. by the conventional blown bubble method, and then to stretch orient such film to render it heat shrinkable by the conventional trapped bubble method. In many cases, such film is irradiatively crosslinked before orientation to enhance orientability. Representatively, such processes are disclosed in U.S. Pat. No. 3,741,253 issued June 26, 1973 to Brax et al.

The term "high barrier" film as conventionally used refers to an oxygen barrier thermoplastic material composed predominately of the barrier constituent to the extent that the material is brittle and relatively difficult to stretch orient. Generally, the higher the barrier constituent, the higher the barrier property, but the higher the degree of crystallinity which tends to embrittle the film to impart corresponding low impact strength.

One approach to making a high barrier, heat shrinkable multilayer film has been to melt-form the composite film and then to stretch orient the film before crystallization of the high barrier material proceeds to an adverse extent. An alternative approach provides for lamination of stretch-oriented barrier film to a heat shrinkable, base film, i.e. the high barrier film is stretch oriented after melt forming and before crystallization proceeds to an adverse extent. Apparently, stretch orientation of nascent high barrier material reduces the size of crystalline regions of the microstructure so that the material does not become brittle. In this alternative approach, it would be desirable to eliminate the stop of stretch orienting the nascent high barrier film. This is the problem with which the present invention is concerned.

Of general interest are the disclosures of U.K. Pat. No. 1,591,423 for "Laminate Film of Polyethylene and Vinylidene Chloride Copolymer" and U.K. Pat. No. 1,591,424 for "Process of Heating Food in a Package of Polymeric Laminate Films" by Thompson published June 24, 1981, which disclose a laminate film formed by coating vinylidene chloride copolymer, other than by melt extrusion, onto the surfaces of a heat shrinkable film.

SUMMARY OF THE INVENTION

It is a primary object of the invention to provide a high oxygen barrier laminate film that is heat shrinkable in spite of the use of relatively brittle high barrier thermoplastic material. It is a secondary object to provide for redundant barrier plies in an exemplary embodiment.

Accordingly, there is provided a heat shrinkable, high barrier laminate film which includes a hot blown, melt oriented high oxygen barrier film laminated to a stretch oriented base film having a heat shrink tension substantially greater than that of said barrier film, the ultimate elongation of said barrier film being substantially less than that of said base film before orientation and the extent of orientation of said base film being sufficient such that its ultimate elongation is reduced so as not to substantially exceed that of said barrier film, and preferably is commensurate therewith. In one preferred mode, the barrier film is a layflat tubular film having its interior layflat surfaces laminated together by self-welding. Preferably, the barrier ply of the barrier film is vinylidene chloride copolymer having a vinylidene chloride content of at least about 85% by weight, most preferably at least about 90%.

Thus, by selective stretch orientation of the base film, troublesome stretch orientation of the high barrier film is avoided.

The term "melt oriented" is intened to refer to a relatively low extent of orientation that is imparted to a hot blowm film incidental to the hot blowing formative process. The relatively low extent of orientation is manifested by a low heat shrink tension relative to that obtained with stretch orientation.

The term "high barrier" is intended to refer to oxygen barrier thermoplastic copolymeric material composed predominately of the barrier constitutent to such an extent that the material is brittle due to a high degree of crystallinity which is manifested by the material having low impact strength relative to that of the material when stretch oriented.

Additionally, there is provided a method for making a heat shrinkable, high barrier laminate film which includes the steps of forming a hot blown, melt oriented high oxygen barrier film; stretch orienting a base film further provided that said barrier film has an ultimate elongation substantially less than that of said base film before orienting and said base film after orienting has a heat shrink tension substantially greater than that of said barrier film, the extent of orientation being sufficient such that its ultimate elongation is reduced so as not to substantially exceed that of said barrier film and preferably is commensurate therewith; and then laminating said barrier film to said base film. Preferably, the method further includes providing the barrier film as a layflat tubular film and laminating together its interior layflat surfaces by self-welding.

BRIEF DESCRIPTION OF THE DRAWINGS

Further details are given below with reference to the drawings wherein.

DESCRIPTION OF THE PREFERRED EMBODIMENTS

Figure 1:
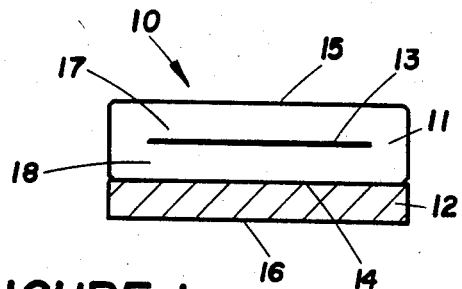
FIG. 1 schematically depicts a cross-sectional view of one preferred laminate film of the invention wherein a melt oriented layflat tubular high barrier film is laminated to a stretch oriented heat shrinkable base film.

In FIG. 1, there is shown a preferred high barrier, heat shrinkable film 10 of the invention wherein a layflat tubular barrier film 11 is laminated to a heat shrinkable planar base film 12. It is a required feature of the invention that barrier film 11 be a hot blow film thereby being melt oriented, i.e. having low heat shrinking potential relative to that typical of stretch orientation as in base film 12. The layflat tubular film 11 is joined together at its internal layflat surfaces as indicated at interface 13. One external layflat surface is laminated to heat shrinkable component film 12 at interface 14. Optionally, the surface of heat shrinkable component film 12 that is joined to the layflat tube may be printed with labeling matter so that upon lamination a trapped label results. The multilayer structure of layflat film 11 includes an internal oxygen barrier layer of high barrier material, as further discussed below. The internal layflat surfaces of layflat film 11 are of a polymeric material of the type characterized as self-welding so that upon passing layflat tube 11 through a set of heated press rollers, self-welding of the internal layflat surfaces occurs to form heat sealed interface 13. The external surface 15 of layflat tube 11 is of a polymeric material that is rendered pressure sensitive adherable to compatible polymeric surfaces by electrostatic conditioning, such as conventional corona discharge treatment. A representative thickness of the tubular film is about one mil overall. A representative thickness of the heat shrinkable component film is about 0.5–0.75 mil.

Heat shrinkable base film 12 provides a stretch-oriented heat shrinkable substrate upon which hot blown layflat tube 11 is laminated at interface 14. Heat shrinkable film 12 has an interior layer that initiates heat shrinking and a surface layer at interface 14 that preferably is rendered pressure sensitive adherable to the outer surface 15 of layflat tube 11 by electrostatic conditioning. In a less preferred mode, lamination at interface 14 can be accomplished by application of a suitable conventional adhesive. In general, lamination at interface 14 is conducted without the application of heat so as not to cause any significant preshrinkage of heat shrinkable base film 12. The exposed surface 16 of base film 12 is of a polymeric material that is preferably heat sealable to the exterior surface 15 of layflat tube 11, so that the laminate film may be used in form/fill/seal applications wherein a longitudinal lap heat seal is made to define a product containing envelope within the enclosure of the film.

Summarizing the surface requirements of the various components of laminate film 10, the internal layflat surfaces of the layflat tube are of a self-welding polymeric material, the external surface of the layflat tube is preferably responsive to corona discharge treatment and is heat-sealable to one surface of the heat shrinkable substrate, and the other surface of the heat shrinkable substrate is preferably responsive to corona discharge treatment.

The laminate film 10 may be characterized as heat shrinkable since the stretch oriented base film 12 will initiate heat shrinkage of the laminate film upon elevation of the laminate film to the appropriate shrink temperature and provides substantial shrink tension. The hot blown high barrier layflat tubular film, having relatively low shrink tension, will follow the heat shrinkage of base film 12 in compatible fashion. It is a required feature of the invention that the base film be stretchoriented to a selected extent such that its ultimate elongation property in the oriented condition is about equal to or less than the ultimate elongation property of the melt-oriented barrier film, and preferably is commensurate therewith. It is believed that this feature accounts for the nontransference of the relatively brittle nature of the high barrier film into the composite film. The term "ultimate elongation" is used in the conventional sense to refer to percent elongation at tensile failure. For example, a typical heat-shrinkable film of irradiatively crosslinked polyethylene being stretch oriented to an elongation of about 400–500% will have an ultimate elongation capacity of about 90%, which is commensurate with the ultimate elongation capacity of hot blown, melt oriented high barrier saran film. The shrink tension of the base film will be substantially greater than that of the barrier film and therefore will be shrink controlling. Thus, by selective stretch orientation of the base film, troublesome stretch orientation of the high barrier film is avoided.

The laminate film 10 is characterized as high barrier film according to two aspects. First, a high oxygen barrier material, as defined above, is used such as vinylidene chloride copolymer having a relatively high vinylidene chloride content, representatively about 85% by weight or greater and preferably at least about 90%. Additionally, the multiplayer structure of layflat tube 11 has an internal oxygen barrier layer so that upon collapsing tube 11 to the layflat configuration two separate spaced apart barrier layers will result in the layflat configuration, one barrier layer appearing above interface 13 at the self-welded internal layflat surfaces and one barrier layer appearing below interface 13, in the regions indicated by 17 and 18 respectively. The two separate spaced apart barrier layers provide redundant barriers against minor manufacturing defects such as pin holes, carbon particle inclusions, and the like as may randomly occur in a large scale manufacturing process.

In a less preferred embodiment of the invention, the barrier film may be a planar film similar in all respects to the foregoing except that, for example, the tubular barrier film 11 is slit into two mirror image films, each of which are laminated into a composite structure as above. Of course, in this configuration redundant barrier plies will not be present since, in effect, only one side of the slit tubular film is being used.

Figure 1A:
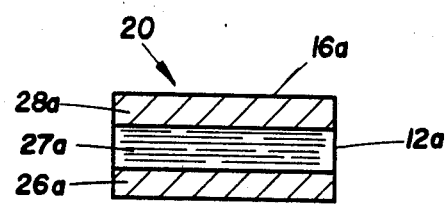
FIG. 1A schematically depicts a transverse cross-section of an alternative laminate film wherein such layflat high barrier film is laminated between heat shrinkable base films.
Figure 1A:
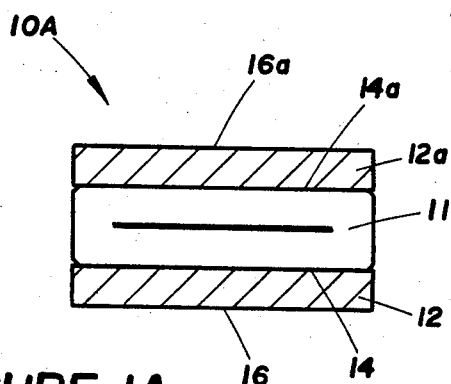

In FIG. 1A, there is shown an alternative embodiment relative to that of FIG. 1 being similar in all respects but having a second heat shrinkable base film 12a adhered to the other of the exterior layflat surfaces of layflat tube 11. Base films 12 and 12a are identical in terms of multilayer structure and are arranged so that they sandwich layflat tube 11 and so that their multilayered structures are in mirror image symmetry about layflat tube 11. Interfaces 14 and 14a are preferably responsive to corona discharge treatment thereby providing the means by which heat shrinkable films 12 and 12a are laminated to the exterior layflat surfaces of layflat tube 11, respectively. Further, the exposed surfaces of shrinkable films 12 and 12a as indicated at 16 and 16a are self-welding to facilitate use of the laminate film in form/fill/seal applications as discussed above.

Figure 2:
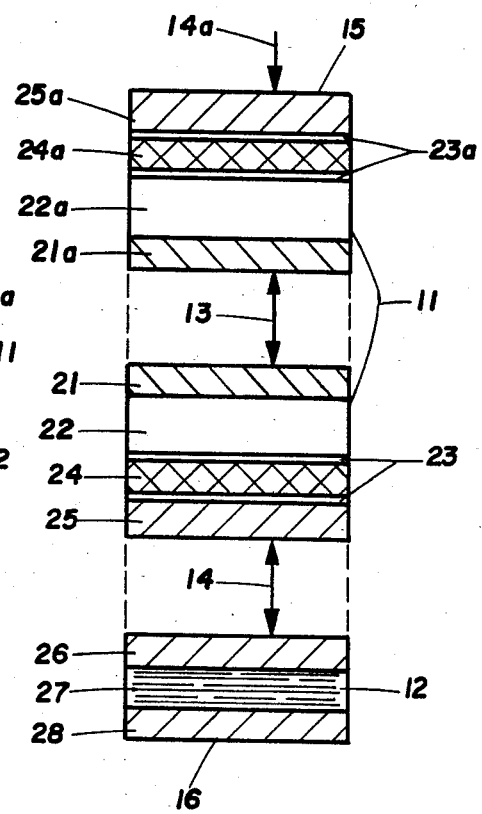
FIG. 2. illustrates the multiply structures of the foregoing embodiments.

In FIG. 2, there is shown an exploded cross-section through the foregoing embodiments of the multiply structure 20 making up the laminate film. The layflat tube 11 has a mirror image multiply structure about interface 13, shown in exploded configuration, which is the interface between the interior layflat surfaces of layflat tube 11. Layers 21 and 21a are interior tacky coatings that promote self-welding of the interior layflat surfaces of tube 11. A preferred composition is EVA (ethylenevinyl acetate copolymer) having 10-40% VA (vinyl acetate) content by weight. Layers 22 and 22a are structural layers and preferably are composed of polyethylene, most preferably low density or linear low density. Optionally, in layflat tubular film 11 layers 21 and 21a may be deleted with the further requirement that layers 22 and 22a be of a self-welding polymeric material such as polyethylene. Layers 24 and 24a are barrier layers of a high oxygen barrier material such as VDC (vinylidene chloride) copolymer having a relatively high VDC content, representatively at least about 85% by weight, most preferably about 90%. As discussed above, the invention provides for imparting substantial heat shrinkable properties to an otherwise relatively brittle high barrier film. Layers 23 and 23a are adhesive interlayers that tie the barrier layers to adjacent layers, respectively. A preferred adhesive is EVA having 5-40% VA content or ethylene-methacrylate copolymer. Layers 25 and 25a form the exterior layflat surfaces of layflat tube 11 and preferably are composed of polyethylene or EVA having a VA content in the range of about 4-10%. Optionally, a conventional opacifying pigment may be added to this layer.

Heat shrinkable base film 12 is joined to one face of the layflat tube at interface 14. Thus, layer 26 is preferably of a material that is rendered pressure sensitive adherable to layer 25 by corona conditioning and preferably is composed of EVA having 4-10% VA content. Layer 27 is a selectively oriented shrink controlling layer and is preferably polyethylene, most preferably low or medium density, that has been cross-linked with ionizing radiation prior to orientation. Exposed surface layer 28 of heat shrinkable base film 12 is heat sealable to layer 25a at surface 15 of layflat tube 11. Preferably, layer 28 is preferably composed of the same polymeric material as layer 26. Optionally, layers 26 and 28 may be deleted so that component film 12 is composed simply of a single layer of heat shrinkable material 27, such as polyethylene, so long as film 12 is adhereable to the layflat tube at interface 14 and is heat sealable to the exterior surface of the layflat tube at surface 15. The discussion of FIG. 2 thus far describes the multilayer structure making up the embodiment shown in FIG. 1.

The multiplayer structure making up the embodiment of FIG. 1A further includes a second heat shrinkable film 12a which is substantially identical to heat shrinkable film 12 and is joined in the structure at surface 15 and is disposed so that film 12a lies in mirror image symmetry relative to film 12 insofar as layer 26a corresponds to 26, layer 27a corresponds to 27, and layer 28a corresponds to 28. The basic multiply structure of the embodiment of FIG. 1A may be represented in minimal terms by the notation S//C/B/A//A/B/C//S wherein A is the self-welding interior surface layer of the layflat tube, B is an intermediate barrier layer, C is a heat sealable and corona treatable exterior layer of the layflat tube, and S is a single ply heat shrinkable planar film.

Key properties of the material of the invention are determinable by the widely accepted testing procedures of ASTM. Specifically, the orientation and shrink tension properties are determinable by ASTM D2838. The ultimate elongation property is determinable by ASTM D882. The oxygen barrier property is determinable by ASTM D3985. The impact strength property is determinable by ASTM D3420. The extent of cross-linking property is determinable by ASTM D2765.

Figure 3:
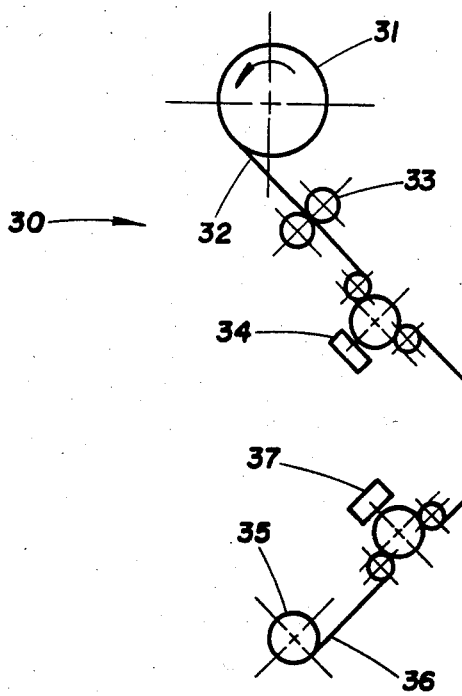
FIG. 3 schematically depicts a process for making the foregoing embodiments.

In FIG. 3, there is depicted a preferred process line 30 for making the embodiment of FIG. 1. The process begins with the provision of roll 31 of layflat tubular film of the type described above. The layflat film is fed out at 32 and passes through the nip of heated press rollers 33, the heated pressing causing self-welding of the interior layflat surfaces of the layflat tube. Optionally, the starting material may be provided already in this condition when the hot blowing formative film process is conducted as part of the overall process by passing the nascent hot blown film through nip rollers while the film is still hot. One exterior surface of the layflat tube is then treated by corona discharge with conventional corona discharge unit 34 to render one face of the layflat tube pressure sensitive adherable. Roll 35 provides a supply of heat shrinkable base film which is fed out at 36 to conventional corona discharge unit 37 which treats one face of the heat shrinkable film to render it pressure sensitive adherable. The two films are then merged in the nip of press rollers 38 with their corona treated surfaces contacting one another so that at 39 a laminated film results of the type shown in FIG. 1. Takeup roll 40 then accumulates the laminate film. The embodiment shown in FIG. 1A may be made in similar fashion except that both exterior layflat surfaces of the layflat tube are corona treated and components 35 through 37 are duplicated on the other side of the process line to sandwich the layflat tube between mirror image heat shrinkable films, the sandwiching being completed in the nip of rollers 38.

In use, the laminate film of the invention may be incorporated in chub packaging of sausage. Chub packaging is essentially conventional form/fill/seal packaging wherein film is first formed into a tube with a longitudinal overlap seal made to close the side of the tube. One end of the formed tube is then clipped, a flowable meat product is then stuffed into the tube, and the remaining end of the tube is clipped thereby completing the food log. Then the chub package is heat shrunk by immersion in a hot water bath at a temperature within the shrink temperature range of the film, whereupon the film shrinks snugly about the contained food product.

Although the present invention has been described in conjunction with preferred embodiments, it is to be understood that modifications and variations may be utilized without departing from the principles and scope of the invention, as those skilled in the art will readily understand. Accordingly, such modifications and variations may be practiced within the scope of the following claims:

What is claimed is:

1. A method for making a heat shrinkable, high barrier laminate film comprising:
   (a) forming a hot blown, melt oriented high oxygen barrier film;

(b) stretch orienting a base film, the extent of orientation being sufficient such that its ultimate elongation is reduced so as not to substantially exceed that of said barrier film further provided that said barrier film has an ultimate elongation substantially less than that of said base film before orienting and said base film after orienting has a heat shrink tension substantially greater than that of said barrier film; and then (c) laminating said barrier film to said base film.

2. The method of claim 1 wherein the extent of said stretch orientation is selected such that the ultimate elongation of said base film is commensurate with that of said barrier film.

3. The method of claim 1 further comprising providing said barrier film as a layflat tubular film and laminating together its interior layflat surfaces.

4. The method of claim 3 further comprising laminating said interior layflat surfaces by self-welding.

5. The method of claim 1 wherein step (c) further comprises laminating said surfaces by corona conditioning and pressing.

6. The method of claim 1 wherein said base film and said barrier film are provided with heat sealable outer surface layers.

7. The method of claim 1 further comprising laminating heat shrinkable mirror image base films to said barrier film so that said base films sandwich said barrier film and are disposed in mirror image symmetry.

* * * * *

UNITED STATES PATENT AND TRADEMARK OFFICE
CERTIFICATE OF CORRECTION

PATENT NO. : 4,605,460

DATED : August 12, 1986

INVENTOR(S) : Henry G. Schirmer

It is certified that error appears in the above-identified patent and that said Letters Patent is hereby corrected as shown below:

In column 6, line 68 after "film" insert -- including a layer of vinylidene chloride copolymer --.

In column 7, line 1 after "film" insert -- including a layer of polyethylene --.

Signed and Sealed this

Twenty-eighth Day of October, 1986

[SEAL]

Attest:

DONALD J. QUIGG

*Attesting Officer*     *Commissioner of Patents and Trademarks*